(12) United States Patent
Hyun et al.

(10) Patent No.: US 9,191,153 B2
(45) Date of Patent: Nov. 17, 2015

(54) TRANSMITTER/RECEIVER FOR SUPPORTING DIFFERENTIAL SIGNALING AND SEMICONDUCTOR TRANSMITTER/RECEIVER SYSTEM INCLUDING THE SAME

(71) Applicant: SK hynix Inc., Gyeonggi-do (KR)

(72) Inventors: Sang-Ah Hyun, Gyeonggi-do (KR); Hyun-Woo Lee, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 14/283,995

(22) Filed: May 21, 2014

(65) Prior Publication Data

US 2015/0171996 A1 Jun. 18, 2015

(30) Foreign Application Priority Data

Dec. 13, 2013 (KR) ........................ 10-2013-0155134

(51) Int. Cl.
*H04B 3/00* (2006.01)
*H04L 1/00* (2006.01)
*H04W 52/02* (2009.01)

(52) U.S. Cl.
CPC ............ *H04L 1/0042* (2013.01); *H04L 1/0075* (2013.01); *H04W 52/0206* (2013.01)

(58) Field of Classification Search
CPC .... H04B 3/00; H04B 5/0075; H04L 25/0272; H04L 25/0266; H04L 1/0042; H04L 1/0075; H04L 25/028
USPC .................. 375/219–220, 257–259, 351, 372
See application file for complete search history.

(56) References Cited

U.S. PATENT DOCUMENTS

| | | | | |
|---|---|---|---|---|
| 5,596,285 | A * | 1/1997 | Marbot et al. | 326/30 |
| 5,936,455 | A * | 8/1999 | Kobayashi et al. | 327/437 |
| 6,765,418 | B2 * | 7/2004 | Murata | 327/115 |
| 6,847,232 | B2 * | 1/2005 | Tinsley | H03K 19/017527 326/84 |
| 7,339,997 | B2 * | 3/2008 | Blaha | 375/257 |
| 7,365,595 | B2 * | 4/2008 | Lee | 327/538 |
| 7,453,305 | B2 * | 11/2008 | Moane et al. | 327/307 |
| 7,598,796 | B2 * | 10/2009 | Mizuno | G11C 5/14 327/536 |
| 7,683,673 | B2 * | 3/2010 | Fensore et al. | 326/86 |
| 7,994,853 | B2 * | 8/2011 | Chao | 330/10 |
| 8,130,217 | B2 * | 3/2012 | Nishimizu et al. | 345/211 |
| 8,351,292 | B2 * | 1/2013 | Matano | 365/226 |
| 8,461,864 | B2 * | 6/2013 | Nakagawa | 326/16 |
| 8,605,070 | B2 * | 12/2013 | Nishimizu et al. | 345/211 |
| 8,649,741 | B2 * | 2/2014 | Iijima et al. | 455/83 |
| 8,659,319 | B2 * | 2/2014 | Hollis | G11C 7/02 326/115 |
| 8,760,168 | B2 * | 6/2014 | Kudo et al. | 324/426 |
| 8,805,314 | B2 * | 8/2014 | Katsube et al. | 327/552 |
| 2011/0025655 | A1 * | 2/2011 | Nishimura et al. | 345/204 |

FOREIGN PATENT DOCUMENTS

KR 100744640 8/2007

* cited by examiner

*Primary Examiner* — Emmanuel Bayard
(74) *Attorney, Agent, or Firm* — IP & T Group LLP

(57) ABSTRACT

A transmitter includes first to third power supply terminals, a first buffer that is electrically coupled between the first power supply terminal and the second power supply terminal and buffers and outputs a first input signal, and a second buffer that is electrically coupled between the second power supply terminal and the third power supply terminal and buffers and outputs a second input signal that is in a differential relation to the first input signal.

19 Claims, 3 Drawing Sheets

US 9,191,153 B2

TRANSMITTER/RECEIVER FOR SUPPORTING DIFFERENTIAL SIGNALING AND SEMICONDUCTOR TRANSMITTER/RECEIVER SYSTEM INCLUDING THE SAME

CROSS-REFERENCE TO RELATED APPLICATIONS

The present application claims priority to Korean Patent Application No. 10-2013-0155134, filed on Dec. 13, 2013, which is incorporated herein by reference in its entirety.

BACKGROUND

1. Field

Exemplary embodiments of the present invention relate to a semiconductor design technology, and more particularly, to a transmitter/receiver that supports differential signaling.

2. Description of the Related Art

Communication systems transmit, receive, store, and search a great amount of data. In complicated systems, transmitters/receivers (Tx/Rx) used for data transmission between integrated circuits (ICs) should perform a high speed operation while supporting various signaling schemes, generate minimum noise, be tolerant to interference, consume low power, and occupy a minimum area on an IC.

Transmitters/receivers according to the conventional art typically support only one signal type, that is, single-ended signaling.

FIG. 1 is a circuit diagram illustrating a transmitter/receiver using a single-ended signaling scheme according to the conventional art.

Referring to FIG. 1, a transmitter 110 and a receiver 120 may include buffers 111 and 121, respectively. The receiver 120 physically uses the same reference signal Vref in receiving a signal OUT outputted from the transmitter 110. Therefore, when the transmitter 110 transmits N signals, since N+1 signal lines (N receiving lines+one reference signal line) are necessary, the cost for circuit configuration is low. However, a concern exists in that the receiver 120 is sensitive to noise.

To resolve this concern of the single-ended signaling scheme, a differential signaling scheme is used.

FIG. 2 is a circuit diagram illustrating a transmitter/receiver using a differential signaling scheme according to the conventional art.

Referring to FIG. 2, a transmitter 210 terminates differential signals D and DB to a first power supply terminal VDD or a second power supply terminal VSS through a buffer 211, and outputs signals OUT and OUTB. Accordingly, a receiver 220 may operate by receiving (IN and INB) which are the differential signals OUT and OUTB outputted from the transmitter 210.

As described above, in the differential signaling scheme when N signals are transmitted/received, signals having phases opposite to those of the N signals are sent together with the N signals, therefore signal lines increase by a factor of two. Furthermore since the difference between the two signals is constant, electromagnetic interference to the signals is reduced when the signals are toggled, so that the differential signaling scheme is advantageous in high speed transmission. However, since two signals having opposite phases are terminated a the first power supply terminal VDD or the second power supply terminal VSS, current is always consumed regardless of signal phase.

SUMMARY

Exemplary embodiments according to the present invention include a transmitter/receiver in which current consumption is low through a differential signaling scheme and hybrid termination.

In accordance with an embodiment of the present invention, a transmitter may include: first to third power supply terminals; a first buffer that is electrically coupled between the first power supply terminal and the second power supply terminal, and buffers and outputs a first input signal; and a second buffer that is electrically coupled between the second power supply terminal and the third power supply terminal, and buffers and outputs a second input signal that is in a differential relation to the first input signal.

In accordance with an embodiment of the present invention, a receiver may include: first to third power supply terminals; an input unit that receives differential input signals and converts voltage levels of the differential input signals to include a reference voltage level; and a differential buffer that receives the converted differential input signals, and compares the converted differential input signals with each other for output.

In accordance with another embodiment of the present invention, a semiconductor transmitter/receiver system may include: a transmission terminal that terminates a first input signal to a first power supply terminal and terminates a second input signal in a differential relation to the first input signal to a third power supply terminal, and outputs signals; and a reception terminal that converts voltage levels of the first and second input signals outputted from the transmission terminal to include a predetermined reference voltage level.

The transmitter according to the aforementioned embodiment is tolerant to noise due to a differential signaling scheme and may perform a high speed operation.

Furthermore, due to hybrid termination in which differential signals are terminated with levels different from each other, it is possible to reduce the amount of current consumed in a differential signaling operation.

DETAILED DESCRIPTION

Figure 1:
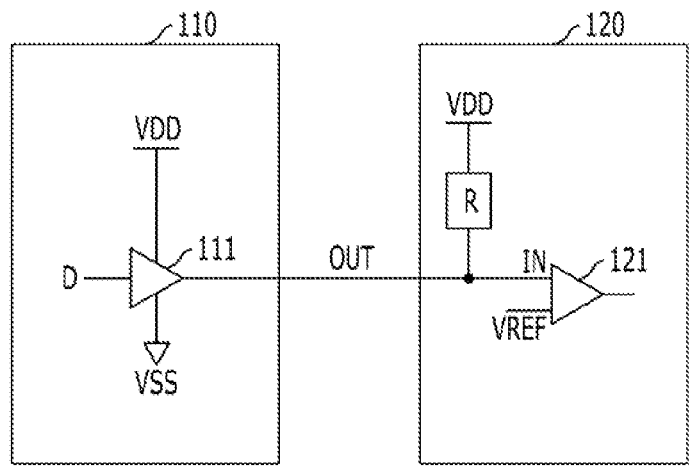
FIG. 1 is a circuit diagram illustrating a transmitter/receiver using a single-ended signaling scheme according to conventional art.
Figure 2:
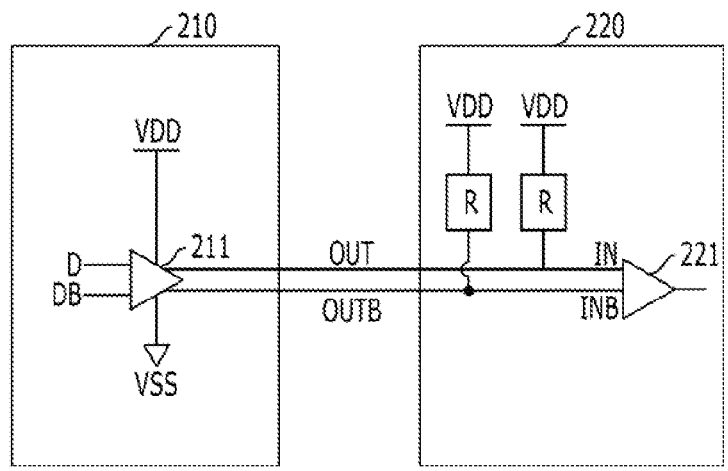
FIG. 2 is a circuit diagram illustrating a transmitter/receiver using a differential signaling scheme according to conventional art.

Various examples and embodiments of the present invention are described below in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, reference numerals correspond directly to the like parts in the various figures and embodiments of the present invention.

The drawings are not necessarily to scale and, in some instances, proportions may have been exaggerated in order to dearly illustrate features of the embodiments. In this specification, specific terms have been used. The terms are used to describe the present invention, and are not used to qualify the sense or limit the scope of the present invention.

It is also noted that in this specification, "and/or" represents that one or more of components arranged before and after "and/or" is included. Furthermore, "connected/coupled" refers to one component not only directly coupling another component but also indirectly coupling another component through an intermediate component. In addition a singular form may include a plural form as long as it is not specifically mentioned in a sentence. Additionally, "include/comprise" or "including/comprising" used in the specification represents that one or more components, steps, operations, and elements exist or are added.

Figure 3:
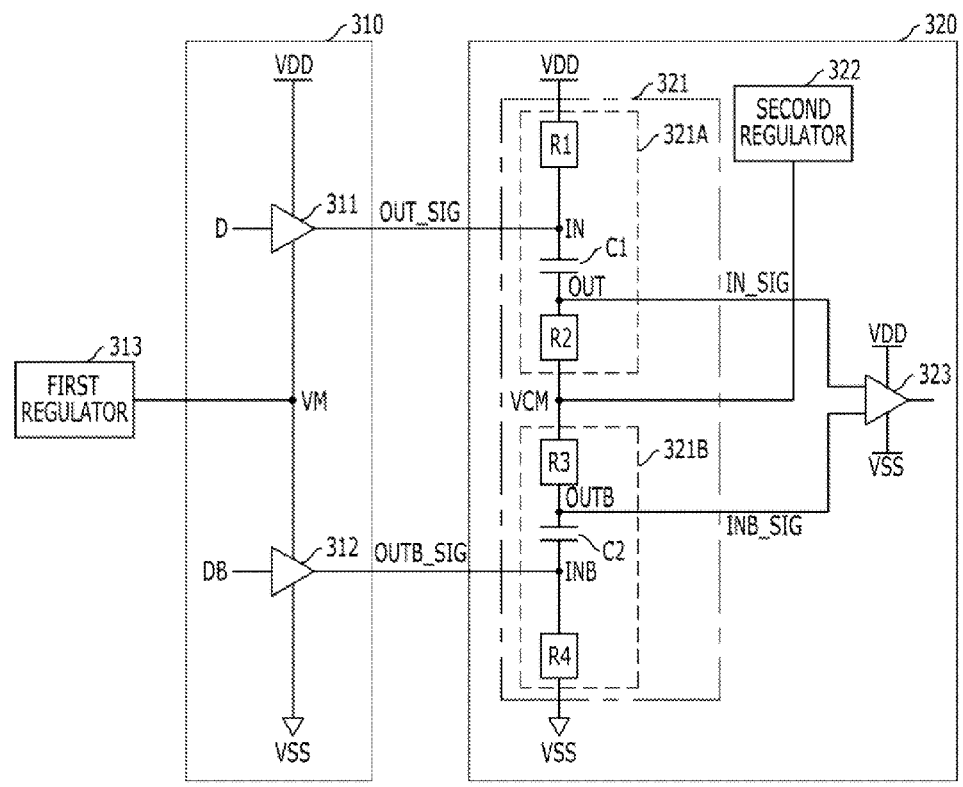
FIG. 3 is a circuit diagram illustrating a transmitter/receiver system using a differential signaling scheme in accordance with an embodiment of the present invention.

FIG. 3 is a circuit diagram illustrating a transmitter/receiver system using a differential signaling scheme n accordance with an embodiment of the present invention.

Referring to FIG. 3, the transmitter/receiver system may include a transmitter 310 and a receiver 320.

The transmitter 310 may include a first buffer 3 and a second buffer 312.

The first buffer 311 is electrically coupled between a first power supply terminal VDD and a second power supply terminal VM, buffers a first input signal D, and outputs a signal OUT_SIG. The first input signal D is terminated to the first power supply terminal VDD and is outputted as a first transmission signal OUT_SIG that is swung between the first power supply terminal VDD and the second power supply terminal VM.

The second buffer 312 is electrically coupled between the second power supply terminal VM and a third power supply terminal VSS, buffers a second input signal DB that is in a differential relation to the first input signal D, and outputs a signal OUTB_SIG. The second input signal DB is terminated to the third power supply terminal VSS and is outputted as a second transmission signal OUTB_SIG that is swung between the second power supply terminal VM and the third power supply terminal VSS.

The first input signal D and the second input signal DB may be data signals including an address or command signal.

Since the first input signal D and the second input signal DB inputted to the first buffer 311 and the second buffer 312 are differential signals that are in a differential relation to each other, the difference between the two signals is constant.

The transmitter 310 may further include a first regulator 313 that supplies the second power supply terminal VM with a predetermined level of voltage. The second power supply terminal VM may supply a first intermediate power having, for example, a level of about 0.5*VDD that is an intermediate level of the first power supply terminal VDD and the third power supply terminal VSS. Accordingly, when the first buffer 311 and the second buffer 312 physically have the same resistance R/2 and the first power supply terminal VDD is "VDD=I*R", since voltage of 0.5*VDD is applied to the first buffer 311 and the second buffer 312, the second power supply terminal VM may be formed with a level of 0.5*VDD.

Since the first transmission signal OUT_SIG outputted through the first buffer 311 is terminated to the first power supply terminal VDD, current is consumed only when the signal is low, hereinafter, referred to as "L", and no current is consumed when the signal is high, hereinafter, referred to as "H". Simultaneously, since the second transmission signal OUTB_SIG outputted through the second buffer 312 is terminated to the third power supply terminal VSS, current is consumed only when the signal is "H" and no current is consumed when the signal is "L".

When the first transmission signal OUT_SIG is "H", since no current consumption occurs due to the termination connection scheme, the current consumption is reduced to ½.

However when the first transmission signal OUT_SIG is "L", since current corresponding to 0.5*VDD is consumed, current corresponding to 0.5*VDD is supplied to the second power supply terminal VM. Therefore, since the second buffer 312 uses the current supplied to the second power supply terminal VM as is, current consumption is reduced again, so that it is possible to reduce the current that corresponds to ¼.

That is, it is possible to reduce current consumption through a charge recycling concept where current remaining after being used in the first buffer 311 does not flow to the ground (i.e., VSS) but is supplied to the second power supply terminal VM again, and is used in the second buffer 312.

The first transmission signal OUT_SIG and the second transmission signal OUTB_SIG outputted through the first buffer 311 and the second buffer 312 may include data signals provided to an external device. The external device may be a memory device and includes a DRAM (Dynamic Random Access Memory), a RRAM (Resistive Random Access Memory), a PRAM (Phase-change Random Access Memory), a FRAM (Ferroelectric Random Access Memory), a MRAM (Magnetic Random Access Memory), an E-fuse and the like.

The receiver 320 may include an input unit 321, a second regulator 322, and a differential buffer 323.

The input unit 321 receives differential input signals OUT_SIG and OUTB_SIG, and converts voltage levels of the differential input signals OUT_SIG and OUTB_SIG to include the level of a reference voltage terminal VCM. The differential input signals OUT_SIG and OUTB_SIG indicate the first and second transmission signals OUT_SIG and OUTB_SIG outputted from the transmitter 310, respectively.

The differential input signals OUT_SIG and OUTB_SIG include a first external input signal OUT_SIG and a second external input signal OUTB_SIG, and the input unit 321 includes a first input node IN electrically coupled to the first power supply terminal VDD to receive the first external input signal OUT_SIG and a second input node INB electrically coupled to the third power supply terminal VSS to receive the second external input signal OUTB_SIG.

The converted differential input signals IN_SIG and INB_SIG include a first internal input signal IN_SIG and a second internal input signal INB_SIG, and the input unit 321 includes a first output node OUT formed between the first input node IN and the reference voltage terminal VCM to provide the first internal input signal IN_SIG and a second output node OUTB formed between the second input node INB and the reference voltage terminal VCM to provide the second internal input signal INB_SIG.

The input unit 321 includes a first coupling section 321A that converts the first external input signal OUT_SIG to the first internal input signal IN_SIG and a second coupling section 321B that converts the second external input signal OUTB_SIG to the second internal input signal INB_SIG.

The first coupling section 321A includes a first coupling capacitor C1 electrically coupled between the first input node IN and the first output node OUT, and the second coupling section 321B includes a second coupling capacitor C2 electrically coupled between the second output node OUTB and the second input node INB.

The first and second coupling capacitors C1 and C2 block DC components of the first and second external input signals OUT_SIG and OUTB_SIG and allow only AC components thereof to pass through, which is called AC coupling. Through such AC coupling, the reference voltage terminal VCM node is formed so that the first and second internal input signals IN_SIG and INB_SIG may have common DC voltage.

The first coupling section 321A further includes a first resistor R1 and a second resistor R2. The first resistor R1 is electrically coupled between the first power supply terminal VDD and the first input node IN to be serially coupled to the first coupling capacitor C1. The second resistor R2 is electrically coupled between the first output node OUT and the reference voltage terminal VCM to be serially coupled to the first coupling capacitor C1.

As described above, the first and second resistors R1 and R2 are added and the first external input signal OUT_SIG is converted to the first internal input signal IN_SIG including the reference voltage terminal VCM, so that a normal swing operation may be performed.

Similarly to the first coupling section 321A, the second coupling section 321B includes third and fourth resistors R3 and R4 serially coupled to the second coupling capacitor C2 between the reference voltage terminal VCM and the third power supply terminal VSS, and the second external input signal OUTB_SIG is converted to the second internal input signal INB_SIG including the reference voltage terminal VCM, so that a normal swing operation may be performed.

The first and fourth resistors R1 and R4 are termination resistors, wherein the first resistor R1 is a pull-up resistor that terminates the first input node IN to the first power supply terminal VDD, and the fourth resistor R4 is a pull-down resistor that terminates the second input node INB to the third power supply terminal VSS When the second resistor R2 and the third resistor R3 are not provided in the first and second coupling sections 321A and 321B, the first internal input signal IN_SIG and the second internal input signal INB_SIG are not swung up and down and are outputted only as a DC component value of voltage that is supplied to the reference voltage terminal VCM. In this regard, when the second and third resistors R2 and R3 are provided, the first internal input signal IN_SIG and the second internal input signal INB_SIG are swung up and down including the reference voltage terminal VCM. Amplitude sizes of the first and second internal input signals IN_SIG and INB_SIG may be changed according to the sizes of the second and third resistors R2 and R3.

A reference voltage level of the reference voltage terminal VCM is an intermediate level of the first power supply terminal VDD and the third power supply terminal VSS, and may be supplied from the second regulator 322. Then, the reference voltage terminal VCM may supply a second intermediate power where the voltage level may be changed according to voltage applied from the exterior. When a predetermined reference voltage is internally generated by physical characteristics of a band gap circuit, the second regulator 322 may amplify the predetermined reference voltage by a unit gain buffer or to a multiple corresponding to the desired voltage, thereby forming the reference voltage terminal VCM.

In an embodiment according to the present invention, the intermediate level of the first power supply terminal VDD and the third power supply terminal VSS is supplied to the reference voltage terminal VCM.

The first and second external input signals OUT_SIG and OUTB_SIG are converted to the first and second internal input signals IN_SIG and INB_SIG through the input unit 321 and the second regulator 322, and are outputted to the first and second output nodes OUT and OUTB.

The differential buffer 323 receives the first and second internal input signals IN_SIG and INB_SIG, compares them with each other, and outputs one piece of data. Then, on the basis of the second internal input signal INB_SIG, the differential buffer 323 may compare the level of the first internal input signal IN_SIG with the level of the second internal input signal INB_SIG, thereby determining whether the level of the first internal input signal IN_SIG is "H" or "L" for output. The differential buffer 323 may output a signal swing between VDD and VSS.

The first external input signal OUT_SIG and the second external input signal OUTB_SIG may be provided from the external device, wherein the external device may include a memory controller.

It is possible to configure a semiconductor system including a memory controller having the configuration of the transmitter 310 and a memory device having the configuration of the receiver 320.

Figure 4:
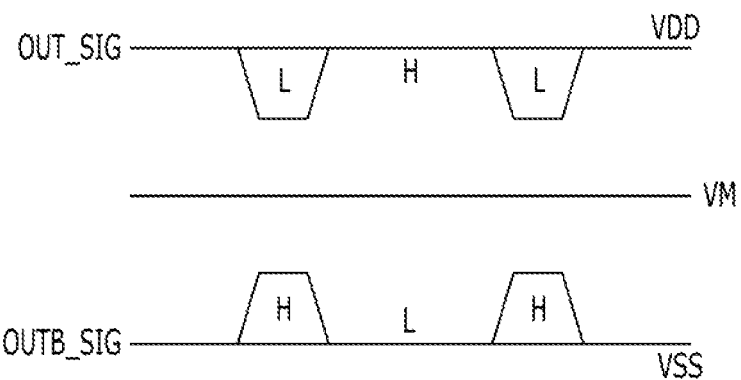
FIG. 4 is a timing diagram illustrating an input/output form of a transmission/reception signal in accordance with an embodiment of the present invention.

FIG. 4 is a timing diagram illustrating an input/output form of the transmission/reception signal in accordance with an embodiment of the present invention.

Referring to FIG. 3 and FIG. 4, the first transmission signal OUT_SIG and the second transmission signal OUT_SIG are in differential relation to each other, and have termination levels different from each other. Therefore, it is possible to confirm that the two signals are swung spaced apart from each other about the second power supply terminal VM.

The level of the first transmission signal OUT_SIG is may be toggled H/L. However, since whether the signal is actually "H" or "L" is determined through the differential buffer 323 of the receiver 320 by employing the second internal input signal INB_SIG as a reference, it is difficult to recognize the level of the first transmission signal OUT_SIG.

Therefore, when the receiver 320 receives the first and second transmission signals OUT_SIG and OUTB_SIG, the level of the first transmission signal OUT_SIG is positioned above the level of the second transmission signal OUTB_SIG. For example, even though the transmitter 310 transmits a signal having a value of "LHL", the receiver 320 determines that the signal has an "H" level. This is due to the DC voltage of the first transmission signal OUT_SIG being larger than that of the second transmission signal OUTB_SIG.

In this regard, the receiver 320 should match a swing level of the first transmission signal OUT_SIG with a swing level of the second transmission signal OUTB_SIG. Details thereof will be described in detail with reference to FIG. 5.

Figure 5:
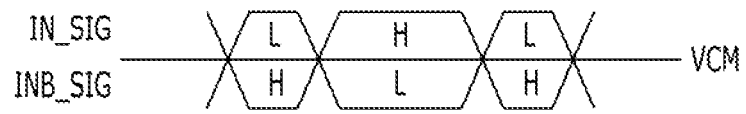
FIG. 5 is a timing diagram illustrating a transmission/reception signal in accordance with an embodiment of the present invention that operates on the basis of a reference voltage terminal.

FIG. 5 is a timing diagram in which the transmission/reception signals in accordance with an embodiment of the present invention operate on the basis of the reference voltage terminal.

Referring to FIG. 3 to FIG. 5, the reference voltage terminal VCM node is formed such that the first transmission signal OUT_SIG and the second transmission signal OUTB_SIG terminated to levels different from each other and, as illustrated in FIG. 4, have common DC voltage.

The first transmission signal OUT_SIG and the second transmission signal OUTB_SIG are received, the reference voltage terminal VCM node is formed through the input unit 321, and the first transmission signal OUT_SIG and the second transmission signal OUTB_SIG are controlled to be swung about the reference voltage terminal VCM, so that the first internal input signal IN_SIG and the second internal input signal INB_SIG may be outputted.

When the first internal input signal IN_SIG and the second internal input signal INB_SIG are inputted in the form as illustrated in FIG. 5, before being inputted to the differential buffer 323, the level of the first internal input signal IN_SIG is compared with the level of the second internal input signal INB_SIG, so that it is possible to determine whether the level of the first internal input signal IN_SIG is "H" or "L" for output.

The transmitter/receiver in accordance with an embodiment of the present invention is tolerant to noise due to the differential signaling scheme and may perform a high speed operation. Furthermore, through the hybrid termination configuration, it is possible to reduce current consumption which may occur due to the differential signaling scheme.

While this specification contains many specifics, these should not be construed as limitations on the scope of any invention or of what may be claimed, but rather as descriptions of features that may be specific to particular embodiments of the present invention. Certain features that are described in this specification in the context of separate embodiments may also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this specification should not be understood as requiring such separation in all embodiments.

Only a few implementations and examples have been described above. Other implementations, enhancements and variations can be made based on what is described and illustrated in this specification.

While the present invention has been described with respect to the specific embodiments, it will be apparent to those skilled in the art that various changes and modifications may be made without departing from the spirit and scope of the invention as defined in the following claims.

What is claimed is:

1. A transmitter comprising:
   first to third power supply terminals;
   a first buffer that is electrically coupled between the first power supply terminal and the second power supply terminal, buffers a first input signal and outputs a first transmission signal; and
   a second buffer that is electrically coupled between the second power supply terminal and the third power supply terminal, buffers a second input signal that is in a differential relation to the first input signal and outputs a second transmission signal that is in a differential relation to the first transmission signal,
   wherein the first and second transmission signals swing spaced apart from each other about a voltage level of the second power supply terminal, and
   wherein the voltage level of the second power supply terminal has an intermediate voltage level between voltage levels of the first power supply terminal and the third power supply terminal.

2. The transmitter of claim 1, wherein the corresponding first and second transmission signals of the first buffer and the second buffer include data signals that are provided to an external device.

3. The transmitter of claim 2, wherein the external device includes a memory device.

4. The transmitter of claim 1, wherein the first input signal and the second input signal include an address or command signal and the first transmission signal is terminated to the first power supply terminal so that current is consumed only when the first transmission signal is in a logic low level and no current is consumed when the first transmission signal is in a logic high level.

5. A receiver comprising:
   first to third power supply terminals;
   an input unit that receives differential input signals, which swing spaced apart from each other about a voltage level of the second power supply terminal, and converts voltage levels of the differential input signals to include a voltage level of the second power supply terminal; and
   a differential buffer that receives the converted differential input signals, and compares the converted differential input signals with each other for output,
   wherein the voltage level of the second power supply terminal has an intermediate voltage level between voltage levels of the first power supply terminal and the third power supply terminal.

6. The receiver of claim 5, wherein the differential input signals include a first external input signal and a second external input signal, and
   the input unit comprises:
   a first input node that is electrically coupled to the first power supply terminal to receive the first external input signal; and
   a second input node that is electrically coupled to the third power supply terminal to receive the second external input signal.

7. The receiver of claim 6, wherein the converted differential input signals include a first internal input signal and a second internal input signal, and
   the input unit comprises:
   a first output node that is formed between the first input node and the second power supply terminal to provide the first internal input signal; and
   a second output node that is formed between the second input node and the second power supply terminal to provide the second internal input signal.

8. The receiver of claim 7, wherein the input unit comprises:
   a first coupling section that converts the first external input signal to the first internal input signal; and
   a second coupling section that converts the second external input signal to the second internal input signal.

9. The receiver of claim 8, wherein the first coupling section includes a first coupling capacitor electrically coupled between the first input node and the first output node, and the second coupling section includes a second coupling capacitor electrically coupled between the second output node and the second input node.

10. The receiver of claim 9, wherein the first coupling section comprises:
   a first resistor that is electrically coupled between the first power supply terminal and the first input node to be serially coupled to the first coupling capacitor; and
   a second resistor that is electrically coupled between the first output node and the second power supply terminal to be serially coupled to the first coupling capacitor,
   wherein the first coupling capacitor is serially coupled to the second resistor.

11. The receiver of claim 10, wherein the first resistor terminates the first input node to the first power supply terminal.

12. The receiver of claim 9, wherein the second coupling section comprises:
   a third resistor that is electrically coupled between the second power supply terminal and the second output node to be serially coupled to the second coupling capacitor; and
   a fourth resistor that is electrically coupled between the second input node and the third power supply terminal to be serially coupled to the second coupling capacitor,
   wherein the second coupling capacitor is serially coupled to the third resistor.

13. The receiver of claim 12, wherein the fourth resistor terminates the second input node to the third power supply terminal.

14. The receiver of claim 9, wherein the differential input signals are supplied from an external device.

15. The receiver of claim 13, wherein the external device includes a memory controller.

16. A transmitter/receiver system comprising:
   a transmission terminal that transmits a first input signal based on a first power supply terminal and a second input signal that is in a differential relation to the first input signal based on a third power supply terminal, wherein the transmitted first and second input signals swing spaced apart from each other about a voltage level of a second power supply terminal; and
   a reception terminal that receives the first and second input signals transmitted from the transmission terminal and converts voltage levels of the first and second input signals to include the voltage level of a second power supply terminal,
   wherein the voltage level of the second power supply terminal has an intermediate voltage level between voltage levels of the first power supply terminal and the third power supply terminal.

17. The transmitter/receiver system of claim 16, further comprising:
   a first buffer that is electrically coupled between the first power supply terminal and the second power supply terminal, and buffers and outputs the first input signal; and
   a second buffer that is electrically coupled between the second power supply terminal and the third power supply terminal, and buffers and outputs the second input signal.

18. The transmitter/receiver system of claim 17, further comprising:
   an input unit that receives the first and second input signals, and converts voltage levels of the first and second input signals to include the voltage level of the second power supply terminal; and
   a differential buffer that receives the converted first and second input signals, and compares the first and second input signals with each other for output.

19. The transmitter/receiver system of claim 16, wherein the first input signal and the second input signal include an address or command signal and the first transmission signal is terminated to the first power supply terminal so that current is consumed only when the first transmission signal is in a logic low level and no current is consumed when the first transmission signal is in a logic high level.

* * * * *